United States Patent [19]

George

[11] Patent Number: 5,785,335
[45] Date of Patent: Jul. 28, 1998

[54] TRAILER CYCLE

[75] Inventor: Donald A. George, Eugene, Oreg.

[73] Assignee: Burley Design Cooperative, Eugene, Oreg.

[21] Appl. No.: 710,083

[22] Filed: Sep. 10, 1996

Related U.S. Application Data

[63] Continuation of Ser. No. 525,366, Sep. 7, 1995, abandoned.

[51] Int. Cl.$^6$ ............................................... B62K 27/00
[52] U.S. Cl. ............................ 280/204; 280/239; 280/273; 280/292; 280/492
[58] Field of Search .............................. 280/204, 230, 280/231, 239, 273, 282, 304.5, 30, 32.7, 292, 492

[56] References Cited

U.S. PATENT DOCUMENTS

| | | | |
|---|---|---|---|
| 552,907 | 1/1896 | Jakobson . | |
| 579,982 | 4/1897 | Jakobson . | |
| 598,872 | 2/1898 | Hunt . | |
| 658,406 | 9/1900 | Straub . | |
| 1,300,343 | 4/1919 | Carswell . | |
| 2,271,255 | 1/1942 | Du Bois . | |
| 4,037,853 | 7/1977 | Sparks | 280/204 |
| 4,174,120 | 11/1979 | Freeman | 280/204 |
| 4,261,592 | 4/1981 | Busseuil . | |
| 4,458,908 | 7/1984 | Strong . | |
| 4,524,987 | 6/1985 | Kim . | |
| 4,756,541 | 7/1988 | Albitre | 280/204 |
| 5,067,738 | 11/1991 | O'Connor . | |
| 5,076,600 | 12/1991 | Fake | 280/204 |
| 5,269,548 | 12/1993 | Milligan . | |
| 5,330,217 | 7/1994 | McCarthy | 280/204 |
| 5,470,088 | 11/1995 | Adams | 280/292 |

FOREIGN PATENT DOCUMENTS

| | | | |
|---|---|---|---|
| 2019471 | 12/1991 | Canada . | |
| 2053546 | 4/1993 | Canada | 280/239 |
| 412985 | 7/1910 | France . | |
| 95376 | 7/1923 | Germany . | |
| 185820 | 8/1936 | Germany . | |
| 4029476 | 3/1992 | Germany . | |
| 1756196 | 8/1992 | Germany . | |
| 1073 | of 1891 | United Kingdom . | |

OTHER PUBLICATIONS

Preliste 1995, Diverso, Feb., 1995, Walser & Rufer, Zurich, Switzerland.

Windschatten, Diverso, Feb. 1991, Walser & Rufer, Zurich, Switzerland.

trailerbikes, Isla Rowntree, Jun., 1995, ITandemania, England.

*Primary Examiner*—Anne Marie Boehler
*Attorney, Agent, or Firm*—Robert D. Varitz

[57] ABSTRACT

A trailer cycle (10) includes a trailer cycle frame (52) having a main tube (54) which extends toward the lead cycle (12). A hitch mechanism (14) is located between the lead cycle and the trailer cycle. A lead-cycle hitch portion (34) is joined to the lead cycle substantially vertically above the hub of the lead-cycle rear wheel (26). A flexible hitch portion (82) is interposed between the trailer cycle frame and the lead cycle hitch portion and is housed in an orthogonal member (84) which contains an adjustable vertical, or pitch, pivot mechanism and a similarly adjustable yaw pivot mechanism. The orthogonal member is constructed and arranged to prevent motion about the roll axis of the trailer cycle relative to the lead cycle. A lead-cycle-hitch engaging member is located at the lower end of the yaw pivot mechanism and selectively engages and releases the lead-cycle hitch portion. A locking mechanism is provided which secures the trailer cycle to the lead. A trailer-cycle hitch portion is fixed to the free end of the main tube and is flexibly connected to the vertical pivot mechanism.

19 Claims, 6 Drawing Sheets

TRAILER CYCLE

This application is a continuation of application Ser. No. 08/525,366, filed on Sep. 7, 1995, now abandoned.

BACKGROUND OF THE INVENTION

The invention relates to trailer cycles for use with a conventional bicycle, and specifically, to a trailer cycle that does not move about a roll axis relative to a lead cycle.

A number of devices are known which attach to a bicycle and may be used to carry a small child. One form of device is the bicycle trailer, examples of which are described in U.S. Pat. Nos. 4,721,320, entitled Bicycle Trailer Hitch; 5,020,814, entitled Collapsible Bicycle Trailer, and 5,267,744, entitled Stroller Wheel Assembly for Bicycle Trailer. These devices are suitable for very small children, however, as children grow, their participation in family bicycle outings increases, and there comes a point at which they wish to ride a bicycle of their own, rather than ride in a trailer. However, even though the children may be old enough to ride a bicycle, they, in all likelihood, do not have sufficient stamina to keep up with their parents during an outing, and probably do not have sufficient maturity to safely ride a bicycle of their own. For this reason, a trailer cycle, which allows the youngster to participate as a "power source", allows the child to more fully participate in family bicycle outings, while maintaining parental control over the child, and also providing a mechanism to carry the child along if the child tires from the physical exertion. Riding on a trailer cycle provides an educational opportunity for the child, in that the child may learn the "rules of the road," by observation, and will also learn cycling etiquette and safety.

A number of mechanisms are known for connecting two or more bicycles together. In fact, such devices date back into the late 1800's. A very early device is shown in U.S. Pat. No. 552,907 which allows the connection of a modified trailer cycle to a lead cycle. Another method of attaching two bicycles together is shown in U.S. Pat. No. 598,872, wherein the front forks of the trailer cycle are attached at the rear axle of the lead cycle. Likewise, U.S. Pat. No. 1,300,343, provides another attachment mechanism for attaching the fork of a trailer cycle to the rear axle of a lead cycle.

A trailer cycle which is intended to be used by a child is shown in U.S. Pat. No. 5,067,738 to O'Conner, which discloses a trailer cycle having a multi-speed sprocket arrangement and which attaches to the seat post of the lead cycle. Canadian Patent No. 2,052,546 to Adams, also shows a trailer cycle which attaches to the seat post of a lead cycle.

Known trailer cycle devices have a number of drawbacks in that the hitch mechanism for attaching the trailer cycle to the lead cycle may cause significant control problems for the rider of the lead cycle, thereby putting both the riders in peril. It is desirable in the use of a trailer cycle that the trailer cycle be limited to only movements about pitch and yaw axes relative to the lead cycle, and that roll movements of the lead cycle be mimicked by those of the trailer cycle. If the trailer cycle is allowed to have a movement about a roll axis which is different from that of the lead cycle, or if there is excessive play about the roll axis in the hitch between the lead cycle and the trailer cycle, control of both cycles is made more difficult.

Another problem with hitch assemblies that allow independent roll of the lead and trailer cycles is the requirement that both cycles be supported when stopped. This requirement can be dangerous in that, following a sudden stop, the lead cycle rider must immediately dismount and grab the trailer cycle to prevent a the trailer cycle from falling over.

The point of attachment of the trailer cycle to the lead cycle should also be as close to the vertical axis of the rear axle of the lead cycle as possible. In this way, the trailer cycle will closely follow the path of the lead cycle and pushing forces exerted by the trailer cycle will be transferred to a stable position on the lead cycle. In the case of those devices which connect the trailer cycle to the lead cycle fore or aft of the vertical axis of the lead cycle rear axle, the trailer cycle will not follow the path of the lead cycle as closely, which may result in the trailer cycle colliding with obstacles which the lead cycle has safely avoided. Additionally, torsional forces exerted by the trailer cycle will cause control problems for both cycles.

Hitch assemblies that attach to the lead cycle seat post are particularly unstable in that the seat post is generally oriented at approximately 73° from the horizontal, causing the trailer cycle to roll less than the lead cycle. This, in turn, may cause a torsional force to be placed on the lead cycle, resulting in an unstable condition for both cycles, and the possibility of control loss.

SUMMARY OF THE INVENTION

The trailer cycle and hitch mechanism of the invention are constructed to provide support for the trailer cycle when the trailer cycle and lead cycle are oriented at 90° to one another. The trailer cycle includes a frame having a main tube which extends toward the lead cycle. A hitch mechanism is located between the lead cycle and the trailer cycle. A lead-cycle hitch portion is joined to the lead cycle substantially vertically above the hub of the lead-cycle rear wheel. A flexible hitch portion is interposed between the trailer cycle frame and the lead cycle hitch portion and is housed in an orthogonal member which contains an adjustable vertical, or pitch, pivot mechanism and a similarly adjustable yaw pivot mechanism. The orthogonal member is constructed and arranged to prevent motion about the roll axis of the trailer cycle relative to the lead cycle and to provide lateral support for the trailer cycle through the lead cycle. In the preferred embodiment, a lead-cycle-hitch engaging member is located at the lower end of the yaw pivot mechanism and selectively engages and releases the lead-cycle hitch portion. A locking mechanism is provided which secures the trailer cycle to the lead cycle. A trailer-cycle hitch portion is fixed to the free end of the main tube of the trailer cycle and is flexibly connected to the vertical pivot mechanism.

It is, therefore, an object of the instant invention to provide a trailer cycle for use with a lead cycle, thereby creating an articulated tandem bicycle.

Another object of the invention is to provide a hitch mechanism between the lead and trailer cycles which will allow pitch and yaw movements of the trailer cycle relative to the lead cycle, but which will not permit any relative roll movement between the two cycles.

Still another object of the invention is to provide a hitch mechanism that will prevent the trailer cycle from falling over when the lead cycle and trailer cycle are arranged with their longitudinal axes at 90° to one another.

Yet another object of the invention is to provide a trailer cycle having a hitch mechanism which allows for easy removal and attachment of the trailer cycle to the lead cycle.

Another object of the invention is to provide a trailer cycle hitch mechanism which provides an attachment point for the trailer cycle to the lead cycle directly over the rear axle of the lead cycle.

A further object of the invention is to provide a trailer cycle which has an adjustable handlebar mechanism.

These and other object and advantages of the invention will become more fully apparent as the description which follows is read in conjunction with the drawings.

BEST MODE OF PRACTICING THE INVENTION

Figure 1:
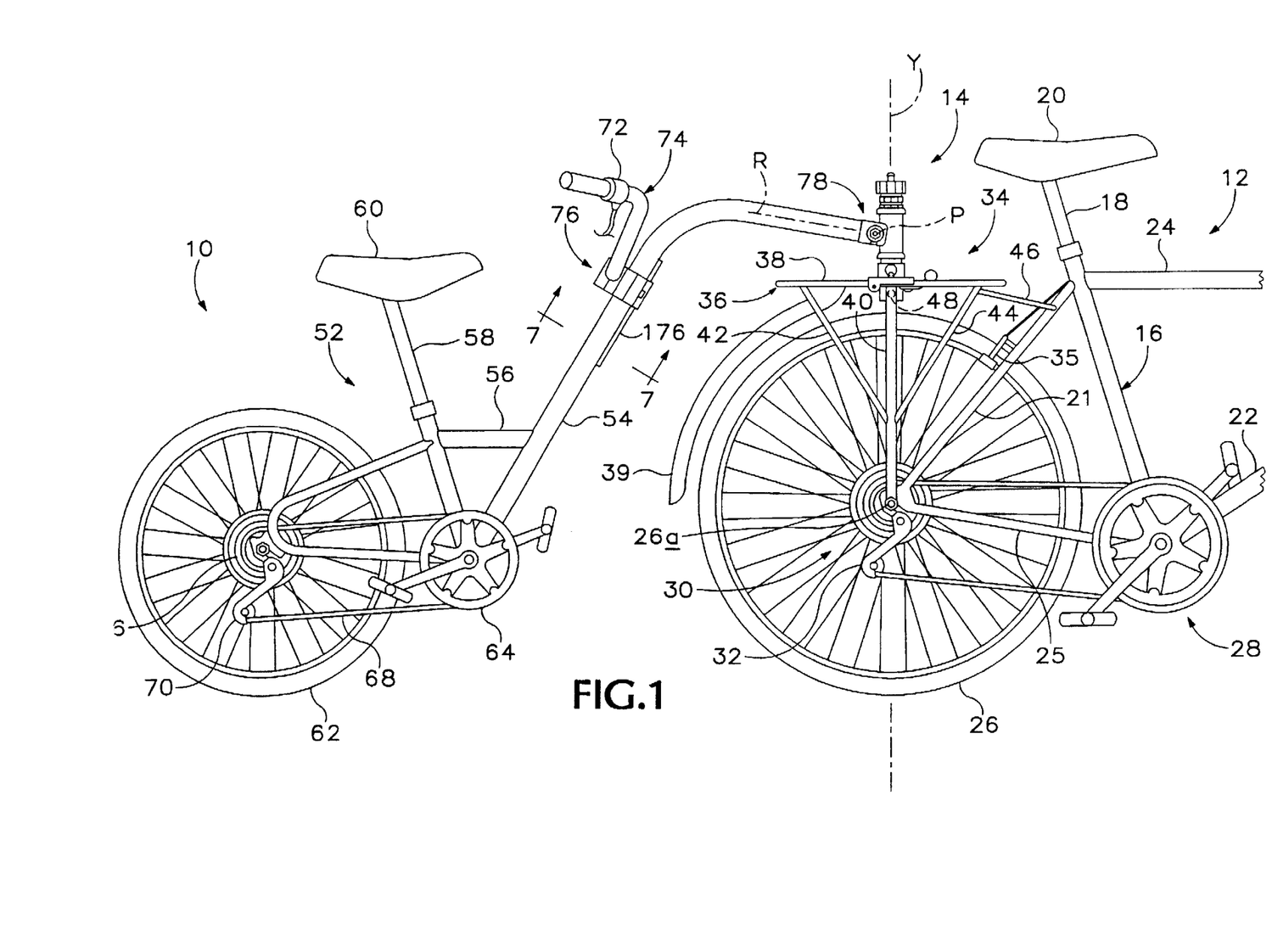
FIG. 1 is side elevation of the trailer cycle of the invention, connected to a lead cycle.

Referring now to the drawings, and initially to FIG. 1, the trailer cycle of the invention is depicted generally at 10, and is shown fastened to a lead cycle 12. A hitch mechanism 14 provides a semi-flexible connection between trailer cycle 10 and lead cycle 12. Hitch mechanism 14 is designed to allow movement of trailer cycle 10 relative to lead cycle 12 about a pitch axis, P, and a yaw axis, Y, but to prevent relative movement about a roll axis, R.

Lead cycle 12 is depicted as a conventional bicycle, but may also take the form of a tandem cycle. Lead cycle 12 has a frame 16, seat post 18, seat 20, seat stay 21, down tube 22, top tube 24 and chain stay 25. Lead cycle 12, as depicted herein, also has a front wheel (not shown), a rear wheel 26, a front crank mechanism 28, depicted as having multiple chainrings thereon, and a derailleur and shifter (not shown), a rear multi-chainring cluster 30, and derailleur 32. A brake 35 acts on rear wheel 26 to stop the lead cycle and the trailer cycle. Lead cycle 12 may be a single speed, three speed, or multi-speed cycle. It may have a conventional or mono frame.

Figure 2:
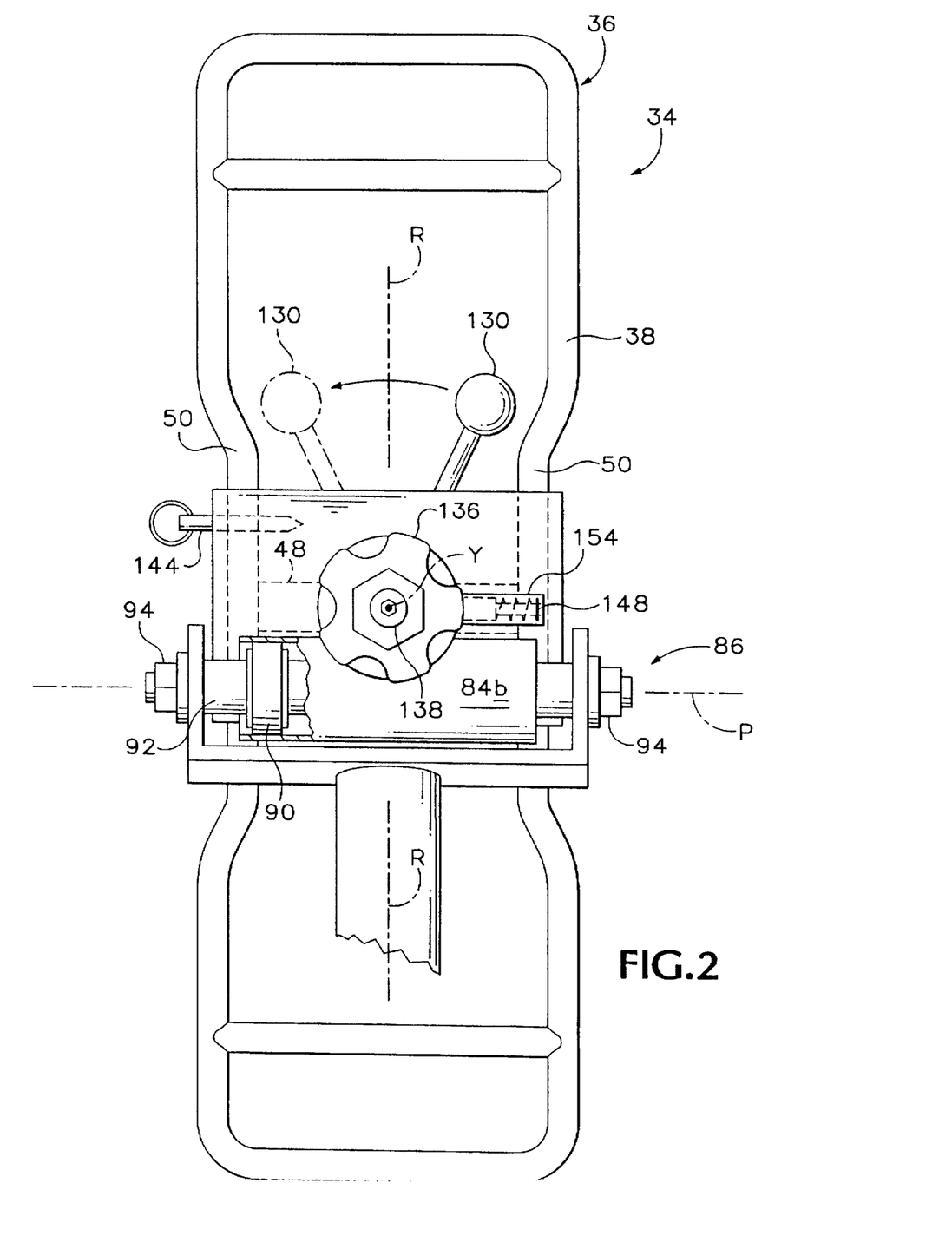
FIG. 2 is top plan view of the hitch mechanism of the invention.

Referring now to FIGS. 1 and 2, a lead-cycle hitch portion is depicted at 34. Lead-cycle hitch portion 34 includes a luggage rack 36 which has a rack frame 38, a splash guard 39, vertical supports 40, diagonal braces 42, 44 and seat-stay attachments 46, which are attached to seat stays 21. A crossbar 48 (best seen in FIG. 3) is fixed between vertical supports 40 on either side of luggage rack 36 and provides an attachment point for hitch mechanism 14.

Vertical supports 40 position crossbar 48 substantially vertically above and parallel to hub, or axle, 26a of rear wheel 26. Rack frame 38 is specially configured to receive trailer cycle 10, in that, and now referring to FIG. 2, rack frame 38 includes an indented portion 50 on each side thereof, to accurately position the other pieces of the hitch mechanism on rack frame 38, and to prevent the coupling of a trailer cycle to a differently configured luggage rack, which may be structurally inadequate to sustain the forces imparted by the trailer cycle on the luggage rack.

Returning again to FIG. 1, trailer cycle 10 includes a frame 52 which includes a main tube 54, a top tube 56, a seat post 58 and seat 60. Trailer cycle 10 includes a single wheel 62, which is mounted on frame 52. A crank 64, which may have multiple chainrings associated therewith, is connected to a single or multiple chainring cluster 66 on wheel 62, by a chain 68. An optional derailleur 70 is connected to a shifting mechanism 72 by a cable (not shown). In the event that crank 64 has multiple chainrings, a suitable derailleur and shifting mechanism is also provided for shifting chain 68 between chainrings on crank 64. Trailer cycle 10 also includes a handlebar 74 which is mounted to main tube 54 by means of a handlebar mount 76. Handlebar mount 76 will be described in greater detail later herein. The joining of lead cycle 12 and trailer cycle 10 through hitch mechanism 14 results in an articulated tandem cycle.

Referring now to FIGS. 1–5, the first embodiment of the hitch mechanism 14 will be described in greater detail. As previously noted, a lead cycle hitch portion 34 includes luggage rack 36 and crossbar 48. A trailer-cycle hitch portion 78 is attached to the free end of main tube 54 and, in the preferred embodiment, takes the form of a U-shaped structure, having slots 80 formed in both arms of the "U"-shaped structure, which are used for attaching the trailer-cycle hitch portion to a flexible hitch portion, depicted generally at 82. Flexible hitch portion 82 includes an orthogonal member 84, which includes a vertical pivot mechanism 86, also referred to herein as a pitch pivot mechanism, which allows movement of trailer cycle 10 about pitch axis P, and a yaw pivot mechanism 88, which allows movement of trailer cycle 10 about a yaw axis Y. Orthogonal member 84 includes a vertical portion 84a, which provided a housing for yaw pivot mechanism 88, and a horizontal portion 84b, which provides a housing for pitch pivot mechanism 86. In the preferred embodiment, orthogonal member 84 is formed of two pieces of lightweight alloy material which are welded together.

Figure 3:
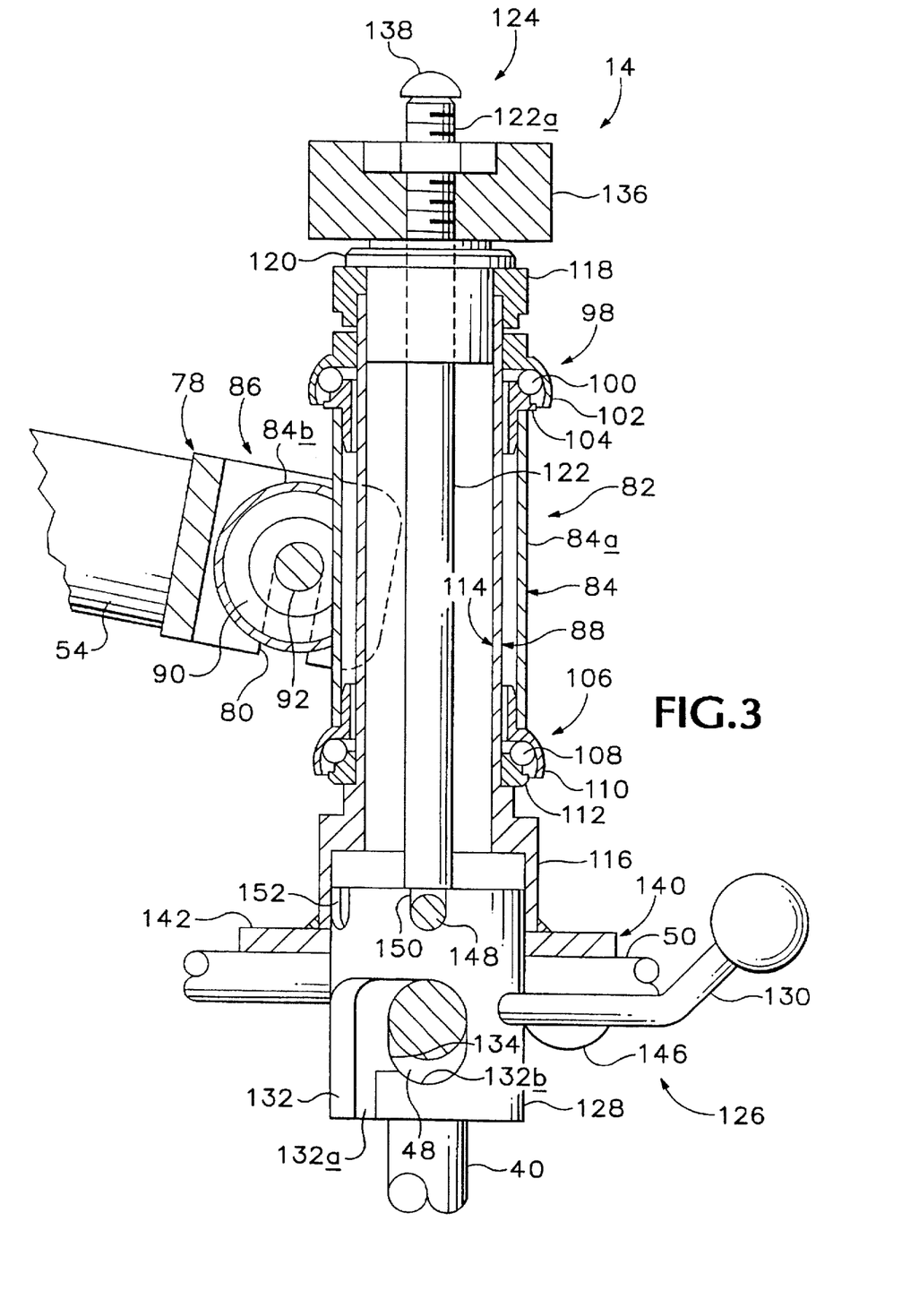
FIG. 3 is an enlarged, side elevation of the hitch mechanism, in an extended position, with portions broken away to show detail.
Figure 5:
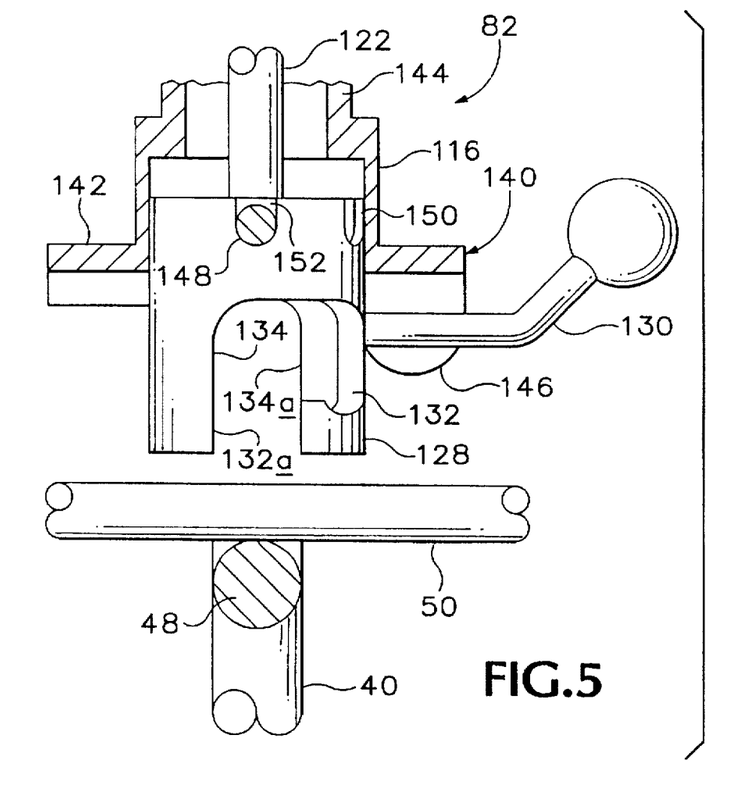
FIG. 5 is an exploded view of a portion of the hitch mechanism, with the trailer cycle detached from the lead cycle.

Turning first to the pitch pivot mechanism 86, in the preferred embodiment, bearings 90 are press-fit into each end of horizontal portion 84b. A shaft 92 is mounted in bearings 90 and extends beyond the lateral margins of horizontal portion 84b. Slots 80 of trailer cycle hitch portion are received on shaft 92 and are held in place by fasteners 94. This arrangement allows trailer cycle 10 to move vertically relative to lead cycle 12 about pitch axis P, which extends through shaft 92 and pitch pivot mechanism 86. Bearings 90 may be conventional ball bearings or any other type of suitable bearing mechanism. Trailer cycle hitch portion 78 may have portions thereof adjacent slots 80 formed with a bend, to provide a safety tab to prevent disengagement of trailer cycle hitch portion 78 from pitch pivot mechanism 86 in the event that fasteners 94 become loose.

Yaw-pivot mechanism 88 is contained within vertical portion 84a of orthogonal member 84 and is assembled much like a conventional head tube of a bicycle. Yaw-pivot mechanism 88, in this embodiment, includes an upper bearing 98, which includes a collection of ball bearings 100, and bearing races 102, 104. A lower bearing 106 includes a collection of ball bearings 108, an upper bearing race 110, and a lower bearing race 112. Yaw pivot mechanism 88 includes an outer shaft member 114, which extends upward from a flanged base 116. Outer shaft member 114 carries bearing race 112 thereon, and includes a threaded portion adjacent the top thereof, which receives bearing race 102 thereon. Bearing race 102 may be adjusted on outer shaft member 114 to control the amount of play allowed between outer shaft member 114 and vertical portion 84a of orthogonal member 84. A compression nut 118 is also received on the top portion of outer shaft member 114 to hold bearing race 102 in place and to provide a seat for a spacer 120.

Spacer 120 has a bore extending through the center thereof, which bore provides a containment for an inner shaft member 122. Inner shaft member 122, and its associated structures, in this embodiment, provide what is referred to herein as a locking mechanism, which is operable for securing trailer cycle 10 to lead cycle 12. Locking mechanism 124 includes a lead-cycle-hitch engaging mechanism, shown generally at 126. Engaging mechanism 126, in this embodiment, includes a bayonet portion 128 and an actuating lever 130. Bayonet portion 128, in the preferred embodiment, is a cylindrical structure which includes opposed, horizontally disposed over-center cutouts 132, 134, each having a slot 132a, 134a, and a detent 132b, 134b, respectively, therein. Bayonet portion 128 is vertically disposed in the interior of flanged based 116 of outer shaft member 114. A part of the over-center cutouts is conformal with crossbar 48, which is releasably engaged by the over-centers. The upper end of inner shaft member 122 is threaded and has a lock nut 136 carried thereon. Lock nut 136 is in turn retained on shaft member 122 by a threaded fastener 138.

Figures 4, 6:
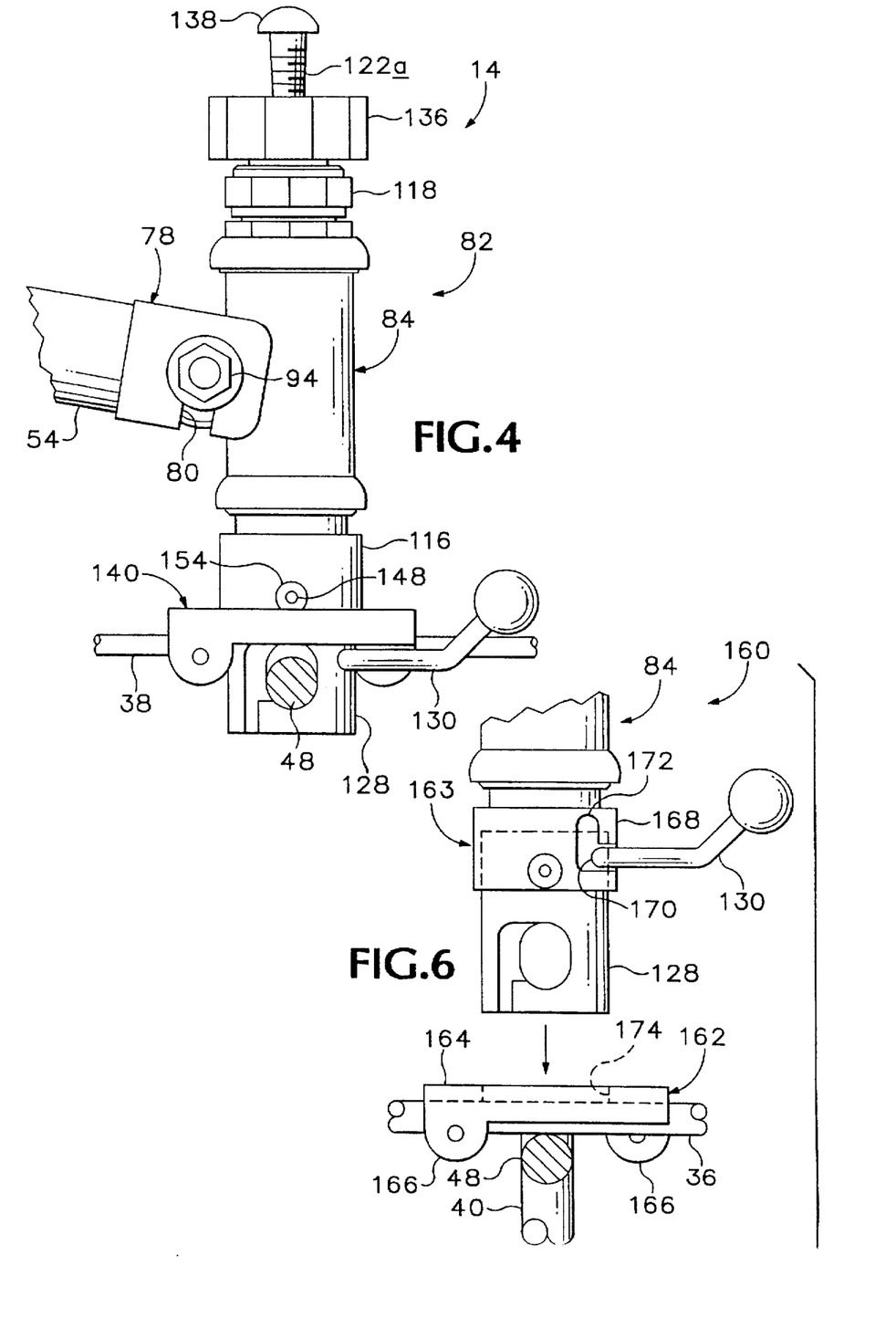
FIG. 4 is a side elevation of the hitch mechanism, in a retracted position.
FIG. 6 is an exploded view of an alternate embodiment of the hitch mechanism of the invention.

Engaging member 126 is vertically shiftable between a first vertical, extended position, depicted in FIG. 3, and a second vertical, retracted position, depicted in FIG. 4. When engaging member 126 is in its extended position, bayonet portion 128 is rotatably shiftable between a locked position, as indicated by the solid line representation of actuating lever 130 in FIG. 2, wherein crossbar 48 is received in the over-center cut out, and a released position, as indicated by the phantom line representation of actuating lever 130 in FIG. 2, wherein crossbar 48 will pass through slots 132a, 134a, and lodge in detents 132b, 134b.

Hitch mechanism 14 also includes a stabilization portion 140 which includes a plate 142, which is fastenable to luggage rack 36, and which, for additional safety, is held on luggage rack 36 by means of pins 144 which extend through ears 146 which are formed as a part of plate 142. In this particular embodiment of the hitch mechanism, stabilization portion 140 is secured to flexible hitch portion 82, as by welding. In another embodiment, stabilization portion 140 may be fixed to the luggage rack, which embodiment will be described later herein.

Operation

The vertical shifting of bayonet portion 128 and the sequential rotation thereof combine to positively lock flexible hitch portion 82 to lead cycle 12 in a three-step operation. With lock nut 136 positioned toward the top of threaded portion 122a, bayonet portion 128 may be vertically shifted (lowered) to its extended position and may be rotated to its released position, by means of actuating lever 130. Flexible hitch portion 82 is then positioned on luggage rack 36 so that crossbar 48 passes through slots 132a, 134a, and plate 142 is received in indented portion 50. Actuating lever 130 is then moved so that bayonet portion 128 is rotated to its locked position. Lock nut 136 is then tightened, drawing inner shaft member 122 vertically upwards and seating crossbar 48 within detents 132b, 134b, thereby placing bayonet portion 128 in its retracted position. A latch pin 148, in the preferred embodiment, is spring biased to engage a detent 150 in bayonet portion 128 when bayonet portion 128 is in its locked position. A second detent 152 is provided to hold bayonet portion in its released position.

Latch pin 148 is contained in a pin receiver 154 which is carried on plate 142.

Trailer cycle 10, in this embodiment, is left attached to hitch mechanism 14. Scenarios may be envisioned where it may be desired to detach the trailer cycle from the hitch mechanism by releasing fasteners 94, as in the situation where another, similarly constructed trailer cycle is to be attached to the lead cycle.

Once flexible hitch portion 82 has been secured to luggage rack 36, trailer cycle 10 may yaw about yaw axis Y relative to lead cycle 12. Yaw axis Y passes through hub 26a of rear wheel 26 of lead cycle 12. It is also apparent from the construction that trailer cycle 10 is not permitted to roll about roll axis R relative to lead cycle 12.

As previously noted, an important consideration in the design and function of the trailer hitch of the invention is that the hitch allows the trailer cycle to move in pitch and yaw axes relative to the lead cycle, but prevents relative movement between the two cycles in the roll axes. The construction of the hitch mechanism, and particularly the orthogonal member, allow only two desired axes movement, while prohibiting roll movement. Additionally, locating the hitch point vertically directly over the real axle provides for precise tracking of the trailer cycle in the path of the lead cycle. Referring to FIGS. 1 and 2, it is apparent that trailer cycle 10 may be moved through yaw axis Y at any angle and may still be held in an upright position by supporting lead cycle 12 in an upright position. This is particularly important when the cycles are stopped, so that the rider of the lead cycle may support the rider of the trailer cycle with the rider of the lead cycle in either a mounted or dismounted position from the lead cycle. In an instance where a hitch mechanism is provided that allows movement about a roll axis, the trailer cycle is free to tip over, and requires that both the lead and trailer cycle be supported. The construction of the hitch mechanism of the invention is such that, with the cycles stopped, the rider of the lead cycle may dismount, rotate the lead cycle 90° relative to the trailer cycle, and very easily support both the lead and trailer cycles in full, upright positions, i.e., at 90° to the horizontal, as well as supporting a rider mounted on the trailer cycle.

The hitch mechanism of the invention is also advantageous and safer than those hitch mechanisms which are secured to the seat post of a bicycle. As previously noted, the seat post is generally oriented at approximately 73° from the horizonal. Assuming that the trailer cycle is attached to the seat post and the previously-described operation of turning a lead cycle 90° relative to the trailer cycle is performed, the lead cycle will have a tilt of 27° from the vertical. This is likely to be an uncomfortable position for a rider mounted on the trailer cycle. It should also be noted that as the lead cycle makes, for instance, a right turn, the trailer cycle will initially be tilted somewhat to the left, assuming that the hitch mechanism does not allow relative roll motion between the lead and trailer cycle. This is uncomfortable for the rider of the trailer cycle and unsafe for both of the riders, in that the cycles are unbalanced in this condition. Even as the lead cycle enters a more severe roll to the right, the trailer cycle will roll at a different rate, and will lag the lead cycle due to the inclination of the seat post and the hitch mechanism attached thereto.

Referring now to FIG. 6, a second embodiment of hitch mechanism 14 is depicted generally at 160. {Where the structures in hitch portion 160 are identical to those in hitch portion 82, like reference numbers are used.} Hitch mechanism 160 includes a flexible hitch portion 163, which is separable from a stabilization portion 162. Stabilization portion 162 may be left on luggage rack 36, or may be removed from the luggage rack. Stabilization portion 162 includes a plate 164 and ears 166, which are used to secured plate 164 to luggage rack 36. Luggage rack 36 still includes vertical supports 40, crossbar 48, rack frame 38 and indented portions 50. The lower portion of flexible hitch portion 163 is similar to flange base 116 of flexible hitch portion 82, however, the base 168 of flexible hitch portion 163 includes a horizontally disposed slot 170, which allows lever 130 to shift in a horizontal plane as bayonet portion 128 is rotated between its locked and released position which communicates with a vertically disposed slot 172, which allows lever 130 to shift upwards with bayonet portion 128 when the bayonet portion is vertically shifted between its extended and retracted positions. Plate 164 has a bore 174 which allows passage of bayonet portion 128 therethrough and which abuts on the lower edge of base 168.

Figure 8:
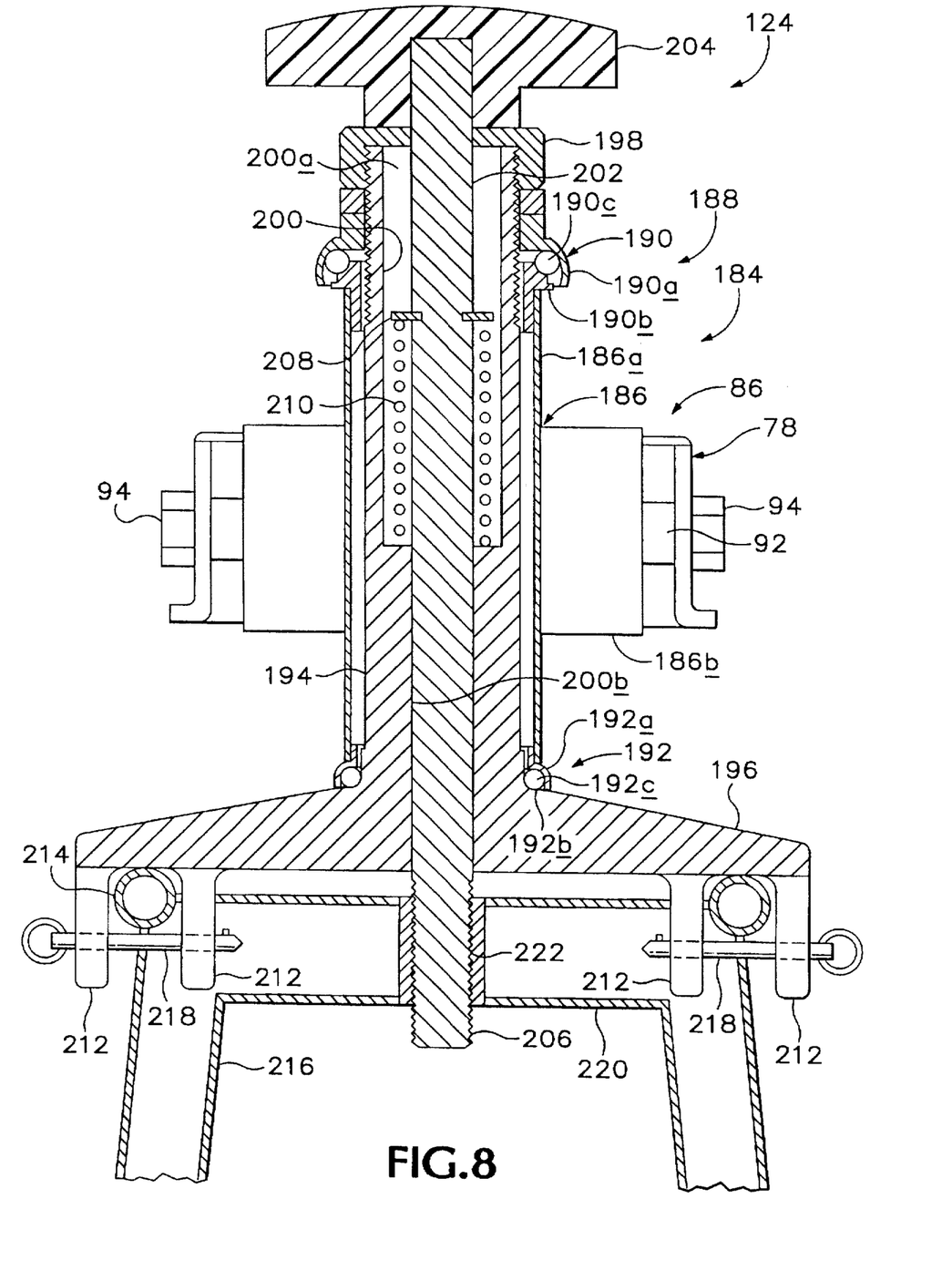
FIG. 8 is a medial sectional, front elevation of a second alternate embodiment of the invention.

Referring now to FIG. 8, another embodiment of the flexible hitch portion is depicted generally at 184. Flexible hitch portion 184 includes an orthogonal member 186, including a vertical portion 186a and a horizontal portion 186b. As with the first-described embodiment, the vertical pitch mechanism is depicted generally at 86. The yaw pivot mechanism for this embodiment is depicted generally at 188 and includes an upper bearing assembly 190, including bearing races 190a, 190b and bearings 190c. A lower bearing assembly is depicted at 192, and includes bearing races 192a, 192b, and bearings 192c. An outer shaft member 194 is received within orthogonal member vertical portion 186a, and, in this embodiment, is integrally formed with a stabilization plate 196. A compression nut 198 is threadably affixed to the top portion of outer shaft member 194 and serves to retain outer shaft member 194 within vertical portion 186a, while allowing rotation of vertical portion 186a relative to outer shaft member 194. Compression nut 198 allows adjustment of the play in the yaw pivot mechanism.

Outer shaft member 194 includes a stepped bore 200 extending thereto. Stepped bore 200 has an upper portion 200a and a lower portion 200b. An inner shaft member 202 extends through stepped bore 200 and forms part of the lead-cycle-hitch-engaging mechanism. Shaft 202 includes a knob 204 located at the upper end thereof. A threaded portion 206 is located at the lower end of shaft 202. In this embodiment, the lead-cycle-hitch-engaging mechanism includes a split ring 208, carried on shaft 202, and a spring 210, which combine to bias shaft 202 to its retracted, first vertical position.

Stabilization plate 196, in this embodiment, includes ears 212 which extend downwards and over the rack frame 214 of a luggage rack 216. Stabilization plate 196 is held on rack from 214 by means of pins 218 which extend through ears 212. Luggage rack 216 includes a crossbar 220, which, in this embodiment, has a threaded receiver 222 therein. In this embodiment of the flexible hitch portion, stabilization plate 196 may be positioned on rack frame 214, in the indented portion thereof. In its unengaged, second vertical position, shaft 202 is urged upward so that threaded portion 206 is contained entirely within lower stepped bore 202b, as the shaft is biased upwards by spring 210. Once the stabilization plate is properly positioned, knob 204 may be grasped by the user and pushed downwards so that threaded portion 206 engages threaded receiver 222. Twisting of knob 204 will shift shaft 202 to its first, vertically extended position, whereby flexible hitch portion 184 is secured to the lead cycle. Pins 218 may then be inserted as an additional safety factor, and a small bore may be provided in threaded portion 206 for receiving another pin to prevent shaft 202 from separating from crossbar 220.

Other variations of the lead-cycle-hitch-engaging mechanism may include a simple bolt and nut mechanism joining the luggage rack to the flexible hitch portion, the provision of a threaded stud on the luggage rack and a threaded receiver on the flexible hitch portion, some form of J-hook carried on the flexible hitch portion, which will engage the crossbar on the luggage rack, the inclusion of an eye bolt fixed on the crossbar and fixed to the flexible hitch portion by means of a threaded fastener, or some type of bayonet mount carried on the luggage rack which will coact with a receiver on the flexible hitch portion.

Figure 7:
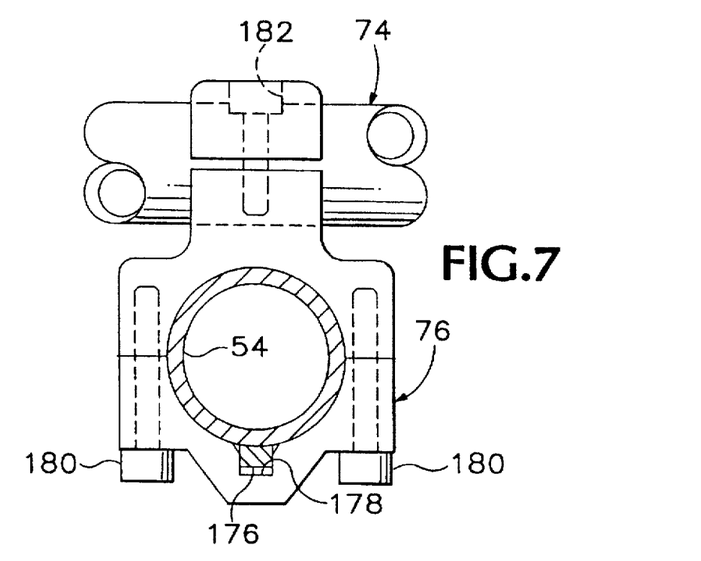
FIG. 7 is a cross-section, taken generally along the line 7—7 of FIG. 1, showing the handlebar mount of the invention.

Turning now to FIG. 7, handlebar mount 76 will be described in greater detail. As previously noted, mount 76 is operable to hold handlebar 74 on main tube 54. However, such an arrangement may result in the rotation of mount 76 about main tube 54, which could result in loss of balance for the rider of trailer cycle 10. To this end, a key 176 is provided along a length of main tube 54 and a key way 178 is provided in mount 76. This combination prevents rotation of mount 76 and handlebar 74 relative to main tube 54. Fasteners 180 are provided to fix mount 76 to main tube 54, while a fastener 182 is provided to secure handle bar 74 in place. As is evident in FIG. 1, key 176 extends for a length along main tube 54, so that the height of handlebar 74 maybe adjusted to fit a particular rider.

Thus, a trailer cycle and a hitch therefor have been disclosed which are operable to secure a trailer cycle detachably to a lead cycle in a manner which will not allow the trailer cycle to roll relative to the lead cycle, but which will allow the trailer cycle to go through pitch and yaw movements relative to the lead cycle. The trailer cycle of the invention may be used by parents to provide socialization of young children in the cycling world.

Although a preferred embodiment and a variation thereof have been disclosed herein, it should be appreciated that further variations and modifications may be made to the invention without departing from the scope thereof as defined in the appended claims.

I claim:

1. In a human powered vehicle, the combination comprising:
   a lead cycle (12), having a front wheel, a rear wheel (26) and a frame (16);
   a trailer cycle (10) including a frame (52) having a main tube (54) extending towards said lead cycle (12); and
   a hitch mechanism (14) including:
      a lead-cycle hitch portion (34) joined to said lead cycle (12) including a crossbar (48, 220) extending parallel to and located substantially vertically above the rear axle (26a) of the lead cycle (12); and
      a flexible hitch portion (82, 160, 184) interposed said trailer cycle frame (52) and said lead cycle (12), including:
         an orthogonal member (84, 186) having a vertical pivot mechanism (86) and a yaw pivot mechanism (88, 188) located therein, which orthogonal member (84, 186) is constructed and arranged to prevent roll motion of the trailer cycle (10) relative to the lead cycle (12),
      wherein said yaw pivot mechanism (88, 188) includes a lead-cycle-hitch-engaging member (126, 206) located thereon for selectably engaging and releasing said lead-cycle hitch portion (34), wherein said lead-cyclehitch-engaging member (126) includes a bayonet portion (128) having a vertically disposed, cylindrical shaft with opposed, horizontally disposed over-center cutouts (132, 134) which are conformal with said crossbar (48) and which is constructed and arranged to releasably engage said crossbar (48); and a trailer-cycle hitch portion (78) fixed on said main tube (54) and connected to said vertical pivot mechanism (86).

2. The human powered vehicle of claim 1 wherein said lead-cycle hitch portion (34) is mounted on a luggage rack (36, 216) which is carried on said lead cycle (12).

3. The human powered vehicle of claim 1 which includes a locking mechanism (124), including said bayonet portion (128), for securing said trailer cycle (10) to the lead cycle (12), wherein said bayonet portion (128) is mounted on one end of a vertically disposed shaft (122), which is mounted in said flexible hitch portion (82, 160) and which is vertically shiftable between an extended position, wherein said trailer cycle frame (52) is detachable from the lead cycle (12), and a retracted position, wherein said trailer cycle frame (52) is secured to the lead cycle (12).

4. The human powered vehicle of claim 3 wherein said locking mechanism (124) includes a threaded member (122a) carried on the other end of said shaft (122) for drawing said bayonet portion (128) vertically upward against said crossbar (48).

5. The human powered vehicle of claim 3 wherein said bayonet portion (128) is rotatably shiftable between a locked position, wherein said trailer cycle frame (52) is secured to the lead cycle (12), and a released position, wherein said trailer cycle frame (52) is detachable from the lead cycle (12); and which further includes a latch pin (148) for releasably fixing said bayonet portion (128) in its locked position; and a screw mechanism (122a) on said flexible hitch portion (82, 160) for selectively securing said bayonet portion (128) in its retracted position.

6. The human powered vehicle of claim 5 which further includes an actuating lever (130) for shifting said bayonet portion (128) between its locked position and its released position.

7. The human powered vehicle of 5 claim which further includes a stabilization portion (140, 162, 196) having a plate (142, 164) which is fastenable to said luggage rack (36).

8. The human powered vehicle of claim 7 wherein said stabilization portion (140) is fixed to said flexible hitch portion (82) and said latch pin (148) is located on said plate (142).

9. The human powered vehicle of claim 7 wherein said stabilization portion (162) is separable from said flexible hitch portion (160) and said latch pin (148) is located on said flexible hitch portion (82).

10. In a human-powered vehicle, the combination, comprising:

a lead cycle (12) having a front wheel, a rear wheel (26), a rear wheel axle (26a) and a frame (16);

a trailer cycle (10) including a trailer cycle frame (52) having:

a chain-driven wheel (62) mounted on said trailer cycle frame (52), a crank (64), a chain (68) extending between said crank (64) and said chain-driven wheel (62), a seat post (58) and a seat (60) mounted thereon, and a main tube (54) extending towards said lead cycle (12);

a handle-bar mount (76) adjustably attached to said main tube (54), and a handle bar (74) mounted therein; and a hitch mechanism (14) including:

a lead-cycle hitch portion (34) joined to said lead cycle (12), wherein said lead-cycle hitch portion (34) is mounted on a luggage rack (216) which is carried on said lead cycle (12) and includes a crossbar (220), said crossbar having a threaded receiver (222) therein;

a stabilization portion (140, 196) joined to said lead-cycle hitch portion (34); and a flexible hitch portion (82, 184) interposed said trailer cycle frame (52) and said stabilization portion (140, 196), including an orthogonal member (84, 186) having a vertical pivot mechanism (86) and a yaw pivot mechanism (88, 188), which orthogonal member (84, 186) is constructed and arranged to prevent roll motion of the trailer cycle (10) relative to said lead cycle (12), a locking mechanism (124) for securing said trailer cycle (10) to said lead cycle (12), which includes a lead-cycle-hitch-engaging member (126, 206) located at the lower end thereof, which lead-cycle-hitch-engaging member (126, 206) is shiftable between a first vertical position for engaging said lead-cycle hitch portion (34) and a second vertical position for releasing said lead-cycle hitch portion (34), and wherein said lead-cycle-hitch-engaging member includes a threaded shaft (202) which is conformal with said threaded receiver (222) and which is shiftable between said first vertical position for engaging said threaded receiver and said second vertical position for releasing said threaded receiver; and a trailer-cycle hitch portion (78) fixed on said main tube (54) and connected to said vertical pivot mechanism (86).

11. The human powered vehicle of claim 10 wherein said lead-cycle-hitch-engaging member includes a spring (210) to bias said shaft (202) to said second, retracted vertical position.

12. The human powered vehicle of claim 10 wherein said crossbar (220) extends parallel to and is located substantially vertically above the rear axle (26a) of the lead cycle (12).

13. The human powered vehicle of claim 10 which further includes a handle-bar mount (76) adjustably attached to said main tube (54), and a handle bar (74) mounted therein.

14. In a human powered vehicle, the combination comprising:

a lead cycle (12), having a front wheel, a rear wheel (26), a rear axle (26a) and a frame (16);

a trailer cycle (10) including a frame (52) having a main tube (54) extending towards said lead cycle (12); and a hitch mechanism (14) including:

a lead-cycle hitch portion (34) joined to said lead cycle (12) including a crossbar (48, 220) extending parallel to said rear axle (26a) of the lead cycle (12), wherein said crossbar (220) includes a threaded receiver (222) therein; and a flexible hitch portion (82, 160, 184) interposed said trailer cycle frame (52) and said lead cycle (12), including:

an orthogonal member (84, 186) having a vertical pivot mechanism (86) and a yaw pivot mechanism (88, 188) located therein, which orthogonal member (84, 186) is constructed and arranged to prevent roll motion of the trailer cycle (10) relative to the lead cycle (12), wherein said yaw pivot mechanism (88, 188) includes a lead-cycle-hitch-engaging member (126, 206) located thereon for selectably engaging and releasing said lead-cycle hitch portion (34), wherein said lead-cycle-hitch-engaging member includes a threaded shaft (202) conformably receivable and removable from said threaded receiver (222); and a trailer-cycle hitch portion (78) fixed on said main tube (54) and connected to said vertical pivot mechanism (86).

15. The human powered vehicle of claim 14 wherein said lead-cycle-hitch-engaging member includes a spring (210) to bias said shaft (202) to said second, retracted vertical position.

16. The human powered vehicle of claim 14 wherein said lead-cycle hitch portion (34) is mounted on a luggage rack (36, 216) which is carried on said lead cycle (12), and wherein said crossbar (220) is integral with said luggage rack.

17. The human powered vehicle of claim 16 which further includes a stabilization potion (140, 162, 196) having a plate (142, 164) which is fastenable to said luggage rack (36).

18. The human powered vehicle of claim 14 wherein said crossbar (220) extends parallel to and is located substantially vertically above the rear axle (26a) of the lead cycle (12).

19. The human powered vehicle of claim 14 which further includes a handle-bar mount (76) adjustably attached to said main tube (54), and a handle bar (74) mounted therein.

* * * * *